United States Patent [19]

Ishikawa et al.

[11] 4,325,856
[45] Apr. 20, 1982

[54] SEQUENTIAL EMULSION POLYMERIZATION PROCESS

[75] Inventors: Tadayoshi Ishikawa, Ayase, Japan; Do I. Lee, Midland, Mich.

[73] Assignee: The Dow Chemical Company, Midland, Mich.

[21] Appl. No.: 108,973

[22] Filed: Jan. 2, 1980

[51] Int. Cl.$^3$ ............................................. C08F 2/24
[52] U.S. Cl. ................................. 523/201; 523/201; 426/411; 428/511; 428/514; 525/301; 525/308; 525/313; 525/309; 525/302; 524/460
[58] Field of Search ............... 260/29.6 RB, 29.6 RW, 260/29.6 WB, 29.6 TA; 525/301, 302, 308, 309, 902, 313

[56] References Cited

U.S. PATENT DOCUMENTS

| | | | |
|---|---|---|---|
| 2,741,650 | 4/1956 | Lukman | 260/29.6 |
| 3,041,306 | 6/1962 | Baer | 525/70 |
| 3,281,385 | 10/1966 | Gardner | 260/29.7 |
| 3,324,066 | 6/1967 | Arcangeli | 260/29.7 |
| 3,404,114 | 10/1968 | Snyder | 260/29.6 |
| 3,448,173 | 6/1969 | Ryan | 260/29.7 |
| 3,719,523 | 3/1973 | Johnson | 525/902 |
| 3,784,498 | 1/1974 | Ceska | 260/29.6 |
| 3,793,244 | 2/1974 | Megee | 260/29.7 |
| 3,801,523 | 4/1974 | Shiratsuci | 260/29.6 |
| 3,803,264 | 4/1974 | Griffith | 260/29.7 |
| 3,803,265 | 4/1974 | Griffith | 260/29.7 |
| 3,959,408 | 5/1976 | Yusa | 525/70 |
| 3,970,725 | 7/1976 | Tugukuni | 260/27 |
| 3,985,703 | 10/1976 | Ferry | 260/42.29 |
| 3,992,485 | 11/1976 | Kosugi | 525/70 |
| 4,001,163 | 1/1977 | Matner | 260/29.7 |
| 4,002,801 | 1/1977 | Knechtges | 428/474 |
| 4,026,962 | 5/1977 | Lambia | 260/29.6 |
| 4,064,087 | 12/1977 | Das | 260/29.6 |
| 4,134,872 | 1/1979 | Lee | 260/29.7 |
| 4,151,143 | 4/1979 | Blank | 260/29.6 |
| 4,199,486 | 4/1980 | Boessler | 260/31.8 M |

FOREIGN PATENT DOCUMENTS

| | | | |
|---|---|---|---|
| 49-20075 | 5/1974 | Japan | 525/70 |
| 860677 | 2/1961 | United Kingdom | 525/70 |
| 928251 | 6/1963 | United Kingdom | 525/70 |
| 969115 | 9/1964 | United Kingdom | 525/70 |

OTHER PUBLICATIONS

Hughes, L. J. et al., J. of Appl. Polymer Sci., vol. 7, pp. 59–69 (1963).
Matsumoto, T. et al., Kobunshi Ronbunshu, Eng. Ed., vol. 3, (No. 9), 1974, pp. 1814–1828.
DL-114-956, Sep. 1975.
SU-499-278, Apr. 1976.

*Primary Examiner*—C. A. Henderson
*Attorney, Agent, or Firm*—James B. Guffey; Jeffrey S. Boone

[57] ABSTRACT

Aqueous copolymer latexes comprising colloidally dispersed, substantially spheroidal copolymer particles having a predominantly hydrophobic core portion and having a relatively hydrophilic polymeric portion which is preferentially oriented toward the outer surface thereof (e.g., a relatively hydrophilic shell portion) are prepared by (a) first emulsion polymerizing an initial monomer charge to form a first aqueous latex of a substantially linear, relatively hydrophilic polymer and (b) thereafter emulsion polymerizing a major proportion (e.g., from about 50 to about 95 parts by weight) of a second (and relatively more hydrophobic) monomer charge in the presence of a minor proportion (e.g., from about 5 to about 50 parts by weight on a polymer solids basis) of said first, relatively hydrophilic polymer latex.

11 Claims, No Drawings

SEQUENTIAL EMULSION POLYMERIZATION PROCESS

BACKGROUND OF THE INVENTION

This invention relates to a process for the preparation of stable, aqueous synthetic copolymer latexes and to the aqueous copolymer latexes produced thereby.

Aqueous dispersions of polymers, which are referred to in the art as latexes, are generally known to be useful, both alone and in various formulations, as coatings, adhesives, impregnants and the like. A wide variety of latexes of differing homopolymeric and copolymeric composition (such as styrene-butadiene copolymers, acrylic homopolymers and copolymers, vinylidene chloride homopolymers and copolymers, etc.) have been developed having specific chemical and/or mechanical properties for particular end use applications. Unfortunately, however, in the custom designing of latexes having such specialized combinations of properties, the full range of flexibility which might be thought possible in theory (e.g., on the basis of the wide variety of known, desirable characteristics individually possessed by the numerous known classes and species of addition polymerizable monomeric ingredients) have proven not to be entirely attainable in practice by virtue of complicating factors such as incompatibility as between the individual classes and/or species of the known monomeric materials; wide divergency of reactivity (or polymerization rates) as between such monomeric materials and the like. (See, for example, U.S. Pat. No. 4,002,801 at Col. 1, lines 38-64.)

In recognition of the foregoing difficulties, attempts have been made in the prior art to overcome, or to at least minimize, such difficulties. For example, in the aforementioned U.S. Patent 4,002,801, it is noted that, while certain desirable reactive monomers are not readily copolymerizable with vinyl halide and vinylidene halide monomers, such reactive monomers can nevertheless be satisfactorily introduced into vinyl halide or vinylidene halide polymers by encapsulating or "overpolymerizing" the desired vinyl or vinylidene halide homopolymer or copolymer with a copolymer (e.g., an acrylate or nitrile copolymer) with which the desired reactive monomers are compatible. Unfortunately, even that suggested improved method is not without its disadvantages and/or limitations (e.g., in terms of the types of encapsulating polymers practicable therein, the upper limit of polymer solids that can be thereby prepared without latex flocculation or coagulation, etc.). Accordingly, it would be highly desirable to provide an improved process by which two or more normally incompatible monomeric materials could be conveniently and economically emulsion polymerized to thereby form synthetic aqueous copolymer latexes having particularly desirable (and conveniently controllable) combinations of properties. In addition, it would be especially desirable to provide such an improved process which would further be widely applicable to a broad range of otherwise incompatible monomer combinations.

SUMMARY OF THE INVENTION

In accordance with the present invention, such an improved process is provided which comprises (A) first preparing an initial aqueous latex of a substantially linear hydrophilic polymer by emulsion polymerizing at a pH of from about 2 to about 6 an initial monomer charge comprising (1) one or more vinyl esters of a non-addition polymerizable carboxylic acid and/or one or more esters of an addition polymerizable carboxylic acid and (2) a relatively hydrophilic copolymerizable comonomer in an amount sufficient to render the copolymer of said initial latex sufficiently hydrophilic that it ultimately becomes preferentially oriented toward the outer surface of the finished copolymer particles of the final copolymer latex product, said relatively hydrophilic comonomer having a solubility in water of at least about 3 weight percent at 25° C. and with the proviso that when the monomer component A (1) is exclusively vinyl acetate, the presence of such relatively hydrophilic comonomer can be eliminated; and (B) thereafter emulsion polymerizing, in the presence of from about 5 to about 50 parts by weight on a polymer solids basis of the initial hydrophilic polymer latex of step A and at a pH of from about 2 to about 6, from about 50 to about 95 parts by weight of a second monomer charge comprising (1) an aliphatic conjugated diene and/or an addition polymerizable monovinylidene monomer selected from the group consisting of monovinylidene aromatic monomers and vinylidene halide monomers and (2) from 0 to about 10 weight percent based upon the weight of such second monomer charge of a monoethylenically unsaturated carboxylic acid monomer.

The foregoing process of the invention is particularly advantageous in that it provides a convenient means of preparing aqueous polymer latexes which can be composed of otherwise incompatible monomeric ingredients and since such process thereby facilitates exceptional flexibility in the design and manufacture of synthetic polymer latex having diverse chemical and/or mechanical properties. Moreover, such process is also advantageous in that it can be quite satisfactorily conducted using conventional emulsion polymerization aids such as the customarily employed dispersion stabilizers and polymerization initiators without the need for necessarily resorting to exotic polymerization conditions such as abnormal pH in the emulsion polymerization processes and/or to the use of unusual emulsion polymerization initiators and/or the requirement of extra steps or procedures such as providing special reactive or grafting sites and the like.

DETAILED DESCRIPTION OF THE INVENTION

The dispersed polymer particles of the latex of the invention are broadly characterized as generally heterogeneous and structured, having a relatively hydrophobic polymer domain and one or more relatively hydrophilic polymer domains.

As used herein, the term "domain" refers to discrete regions within the dispersed polymer particle which are either the aforementioned hydrophobic polymer or the aforementioned hydrophilic polymer.

The distribution of the hydrophilic and hydrophobic polymer domains within the dispersed polymer particles is generally such that the particle has a relatively hydrophobic central portion (e.g., a hydrophobic core portion) and one or more relatively hydrophilic portions preferentially oriented toward the outer surface thereof. Thus, for example, such particles can be conveniently envisioned as being composed of a generally spheroidal, hydrophobic core portion which is either totally or partially surrounded or encapsulated by an encompassing shell of the hydrophilic polymer or which has several discrete regions of such hydrophilic polymer on the surface thereof.

The size of the aforementioned dispersed polymer particles can vary. However, as a general rule, such particles have an average diameter of from about 0.08 to about 0.5, preferably from about 0.1 to about 0.3, micrometer.

In preparing the aqueous polymer latexes of the invention, an initial latex of a substantially linear (i.e., not substantially cross-linked) hydrophilic polymer is first prepared via emulsion polymerization techniques and thereafter a major proportion (e.g., from about 50 to about 95, preferably from about 75 to about 95, and most preferably from about 80 to about 90, parts by weight) of a relatively hydrophobic monomer charge is emulsion polymerized in the presence of a minor portion (e.g., from about 5 to about 50, preferably from about 5 to about 25, and most preferably from about 10 to about 20, parts by weight on a polymer solids basis) of such initial hydrophilic polymer latex.

Monomeric ingredients advantageously employed in the preparation of the aforementioned initial hydrophilic polymer latexes include (1) one or more vinyl esters of a non-addition polymerizable carboxylic acid and/or one or more esters of an addition polymerizable carboxylic acid and (2) optionally in the case of vinyl acetate but otherwise as a necessary and required feature, at least one relatively hydrophilic monomer which is addition copolymerizable therewith. Thus, for example, suitable initial hydrophilic polymer latexes for use in the present invention include (a) emulsion copolymerization products of one of more relatively hydrophilic monomers such as monoethylenically unsaturated carboxylic acid and/or the various amide-, aldehyde-, glycidyl-, hydroxyalkyl-containing derivatives thereof with one or more vinyl esters of a non-addition polymerizable carboxylic acid and/or with one or more saturated aliphatic esters of a monoethylenically unsaturated carboxylic acid as well as (b) homopolymerized polyvinyl acetate.

Suitable vinyl esters for use in the aforementioned hydrophilic polymer latexes are those which do not impart substantial cross-linking to the resulting hydrophilic polymer. Accordingly, the vinyl ester monomers typically employed are those vinyl esters in which the acid component is not readily addition polymerizable and such vinyl esters thus include those of aromatic and saturated aliphatic (e.g., alkanoic) carboxylic acids. Vinyl esters of particular interest in the practice of this invention are those of saturated aliphatic or aromatic acids which contain from about 2 to about 8 carbon atoms such as, for example, vinyl acetate, vinyl propionate, vinyl butyrate, vinyl-2-ethylhexoate, vinyl benzoate and the like. Naturally, the less expensive and more readily available esters such as vinyl acetate, vinyl propionate, etc. (particularly vinyl acetate) are especially desirable for the practice of the present invention and are therefore preferred.

The amount of the aforementioned vinyl ester monomer employed in the above-described hydrophilic polymer latex can vary somewhat in the practice of the present invention, depending, of course, upon the intended end-use of the final polymer latex ultimately produced and upon the precise mechanical or chemical properties desired in such end-use as well as upon the relative hydrophilicity of the particular vinyl ester chosen for use therein. Thus, for example, when vinyl acetate is employed as the vinyl ester component in the practice of the instant invention, it can generally be employed in amounts ranging from 0 up to 100 (preferably from 0 up to about 99) weight percent based upon the total weight of the monomer charge employed to prepare the aforementioned hydrophilic polymer latex. However, in the case of other (e.g., relatively more hydrophobic) vinyl ester monomers, the amount thereof employed is generally in the range of from 0 to about 99 (preferably from 0 to about 97) weight percent based upon the total monomer charge for such hydrophilic polymer latex. Moreover, in the case of all of such vinyl ester monomers, it is sometimes preferable (e.g., in certain end-use applications such as in adhesive applications, as binder components in certain types of paper coating compositions and the like) that such vinyl ester constitutes from about 20 to about 85 (especially from about 20 to about 60) weight percent of the monomer charge employed for the above-described hydrophilic copolymer latex.

As is the case with the above-described vinyl ester monomers, suitable esters of addition polymerizable carboxylic acids for use in the aforementioned hydrophilic latexes are those which do not impart substantial cross-linking to the resulting hydrophilic polymer. Accordingly, the addition polymerizable carboxylic acid esters typically employed are esters of a non-addition polymerizable alcohol with an addition polymerizable carboxylic acid such as, for example, an ester of a monohydric aromatic or saturated aliphatic alcohol or monoester of a polyhydric (e.g., dihydric, trihydric, etc.) aromatic or saturated aliphatic alcohol and a monoethylenically unsaturated carboxylic acid.

Within the foregoing class of esters of addition polymerizable carboxylic acids, species thereof which are of particular interest in the practice of the present invention include $C_2$ to about $C_4$ hydroxyalkyl ester of addition polymerizable monoethylenically unsaturated carboxylic acids (e.g., 2-hydroxyethyl acrylate, 3-hydroxypropyl acrylate, etc.) as well as $C_1$ to about $C_8$ alkyl esters of such monoethylenically unsaturated carboxylic acids (e.g., methyl acrylate, methyl methacrylate, ethyl acrylate, ethyl methacrylate, 2-chloroethyl methacrylate, propyl acrylate or methacrylate, n-butyl acrylate or methacrylate, 2-ethylhexyl acrylate and the like).

The amount of the above-described addition polymerizable carboxylic acid esters employed in preparing the aforementioned hydrophilic copolymer latex is not particularly critical so long as the amount and nature thereof does not prevent the resulting hydrophilic polymer from ultimately becoming preferentially oriented toward the outer surface of the dispersed polymer particle of the final latex prepared by the practice of the instant invention. Thus, in the case of addition polymerizable carboxylic acid esters such as, for example, methyl, ethyl or propyl acrylate which are relatively hydrophilic and which, when homopolymerized, generally form relatively soft (e.g., relatively low melting) polymers, such monomers are suitably employed in amounts ranging from 0 to about 99 weight percent based upon the total weight of the monomer charge for the hydrophilic polymer latex. However, in the case of addition polymerizable carboxylic acid esters which are relatively less hydrophilic and/or which tend to form somewhat harder (e.g., higher melting) polymers, the maximum amount thereof advantageously employed in the hydrophilic polymer latex is somewhat lower than the aforementioned 99 weight percent figure. Thus, for example, in the case of relatively hard monomers such as methyl methacrylate, the amount thereof employed in preparing the initial hydrophilic polymer latex (i.e., the first stage polymer latex) is typically in the range of from 0 to about 85 weight percent of the initial monomer charge. Similarly, in the case of the relatively more hydrophobic addition polymerizable carboxylic acid ester monomer such as n-butyl acrylate, 2-ethylhexyl acrylate, etc., the amount thereof employed is advantageously in the range of from 0 to about 90 or 95 weight percent of the monomer charge employed for the indicated hydrophilic polymer latex.

As is indicated above (and with the exception of the case when the hydrophilic polymer latex is homopolymerized polyvinyl acetate), the aforementioned hydrophilic polymer latex is prepared by emulsion copolymerizing at least one of the hereinbefore described vinyl ester or addition polymerizable carboxylic acid ester monomer with at least one hydrophilic monomer which has a solubility in water of at least about 3 weight percent at 25° C. Preferably, such hydrophilic monomer is a monoethylenically unsaturated carboxylic acid, especially a monobasic, monoethylenically unsaturated carboxylic acid containing from 3 to about 10 carbon atoms such as, for example, acrylic acid, methacrylic acid, crotonic acid, haloacrylic acids (e.g., 2-chloroacrylic acid, 2-bromoacrylic acid, 3-chloroacrylic acid, 2,3-dichloroacrylic acid, 3,3-dichloroacrylic acid, etc.), 2-phenylacrylic acid, 3-phenylacrylic acid, vinyl benzoic acid, isopropenyl benzoic acid and the like. However, relatively hydrophilic (e.g., amide-, aldehyde-, glycidyl-, hydroxy alkyl-, etc., containing) derivatives of such monoethylenically unsaturated carboxylic acids can also be suitably employed and examples of such suitable hydrophilic derivatives thus include acrylamide, methacrylamide, acrolein, methacrolein, glycidyl acrylate and methacrylate, hydroxyethyl acrylate, and the like. Similarly, monoethylenically unsaturated dicarboxylic acids such as, for example, fumaric, itaconic, maleic, etc., can also be beneficially employed as the hydrophilic monomer component, particularly if used in combination with one or more of the aforementioned monobasic carboxylic acid monomers. Naturally, the monoethylenically unsaturated carboxylic acid monomers of particular interest are those which are relatively inexpensive and readily available. Accordingly, the preferred species of such monomers are those having from 3 to about 5 carbon atoms and most preferably acrylic or methacrylic acid is employed.

The amount of the above-identified, relatively hydrophilic monomer employed in the hydrophilic polymer preparation step of the instant invention is not particularly critical so long as it is (a) enough to render the first stage polymer suitably hydrophilic (i.e., so that such hydrophilic polymer is ultimately predominantly located at or near the outer surface of the dispersed polymer particles in the final aqueous polymer latex) while at the same time (b) not being so much as to cause the resulting hydrophilic polymer to be completely soluble (i.e., as opposed to either being totally insoluble or swellable) in aqueous medium under acidic or neutral conditions. Accordingly, the actual weight percentage content range applicable will depend largely upon the particular comonomer, or combination of comonomers, selected for use with the chosen hydrophilic monomer as well as the identity of the chosen hydrophilic monomer itself. Thus, for example, when the selected hydrophilic polymer is to be formed using vinyl acetate, as either the only, or the predominant, monomeric component, then the chosen hydrophilic monomer component will generally constitute from 0 to about 30 (typically from 0 to about 10, preferably from about 1 to about 10, in the case of a binary vinyl acetate/carboxylic acid copolymer) weight percent of the hydrophilic stage monomer charge. However, when substantial portions of a relatively more hydrophobic comonomer or of a relatively hard comonomer is employed, then relatively larger quantities of the hydrophilic monomer component are generally employed. Thus, for example, when a substantial amount of a monomer such as ethyl acrylate or vinyl propionate is employed in the first stage hydrophilic copolymer latex, the relatively hydrophilic monomer employed therein typically constitutes from about 3 to about 30 weight percent of the monomer charge thereof. Further, when even more hydrophobic acrylate or methacrylate esters (e.g., n-butyl acrylate, 2-ethylhexyl acrylate, etc.) are employed, then the hydrophilic monomer component will generally constitute from about 5 up to as much as about 50 weight percent of the first hydrophilic copolymer. Similarly, when substantial amount of a relatively hard comonomer such as, for example, methyl methacrylate, styrene, acrylonitrile, etc., are employed, then the hydrophilic comonomer component will generally constitute from about 10 or 15 to about 50 weight percent of the monomer charge employed in preparing the relatively hydrophilic first stage polymer latex.

In addition to the hereinbefore described monomers (i.e., the monoethylenically unsaturated carboxylic acid monomer, or hydrophilic derivative thereof, in combination with the indicated vinyl ester monomer and/or the aforementioned addition polymerizable carboxylic acid ester monomer), the monomer charge employed to form the above-described hydrophilic first stage polymer latex can also optionally contain one or more other momomers which are addition polymerizable with those required monomers. Examples of such suitable optional monomers include nitriles of the above-described monoethylenically unsaturated carboxylic acids (e.g., acrylonitrile, methacrylonitrile, etc.) as well as monovinylidene aromatic monomers, vinylidene halide monomers and the like. The amount of such optional monomers employed in the first stage hydrophilic copolymer latex is not particularly critical so long as the amount thereof is not so much as to cause such first stage latex to be too hydrophilic or too hydrophobic. Thus, when a relatively hydrophilic optional monomer is employed, the amount thereof is limited such that the resulting hydrophilic polymer is not rendered completely soluble in neutral or acidic aqueous medium. Similarly, when a relatively hard and/or hydrophobic optional monomer is employed (e.g., nitriles of ethylenically unsaturated carboxylic acids, monovinylidene aromatic monomers, vinylidene halide monomers, etc.), the amount thereof is limited such that the ability (e.g., in terms of hydrophilicity and mobility) of the resulting first stage hydrophilic polymer to preferentially orient itself toward the outer surface of the final heterogeneous polymer particles is not substantially impaired. Thus, while the total amount of the aforementioned optional monomers employed in preparing the first stage hydrophilic polymer latex may range from 0 to about 50 weight percent, it is generally preferable to employ such monomers at a level of from 0 to about 20 (especially from 0 to about 10) weight percent based upon the total weight of the monomer charge employed in preparing such first stage hydrophilic polymer latex.

In addition to the foregoing (and in a preferred embodiment thereof), the present invention also contemplates and provides for the preparation of aqueous latexes in which the dispersed polymer particles have incorporated therein (i.e., interpolymerized therein) certain reactive or functional modifying monomers having reactive sites (i.e., sites for curing or crosslinking of the final copolymer product via a nonaddition polymerization reaction mechanism) to thereby render the final polymer latex of the invention reactive or curable in character. Accordingly, in addition to the monomers hereinbefore described for use in preparing the aforementioned first stage, hydrophilic copolymer latex there may optionally also be employed a minor portion (e.g., from 0 to about 20, preferably from about 0.5 to about 20, and most preferably from about 5 to about 15, weight percent based on the monomer charge for such first stage latex) of one or more addition polymerizable modifying monomers such as, for example, N-alkylol acrylamide or methacrylamide (e.g., N-methyloyl acrylamide or methacrylamide); N-alkyloxyalkyl acrylamide or methacrylamide (e.g., N-isobutoxymethyl acrylamide or methacrylamide); glycidyl acrylate or methacrylate; acrolein or methacrolein; isopropenyl oxazoline and the like. Naturally, when such modifying monomers are relatively hydrophilic in character (e.g., N-alkylol acrylamide or methacrylamide, N-alkyloxyalkyl acrylamide or methacrylamide, glycidyl acrylate or methacrylate, acrolein or methacrolein, etc.), then such modifying monomers can serve the dual purpose of providing the requisite hydrophilicity to the first stage polymer latex (i.e., acting as the requisite hydrophilic first stage monomer) as well as imparting reactive (e.g., curable) or functional character thereto.

The preparation of the above-described hydrophilic copolymer latexes (i.e., which constitutes the first stage of the overall process of the instant invention) is conveniently conducted pursuant to the well-known conventional emulsion polymerization techniques in acidic aqueous medium. Thus, for example, the monomer charge desired to be employed for the hydrophilic copolymer latex is dispersed in an acidic aqueous medium with agitation and with the aid of from about 0.5 to about 5 weight percent (based upon the monomer charge) of conventional anionic and/or nonionic emulsifiers (e.g., potassium n-dodecyl sulfonate, sodium isooctylbenzene sulfonate, sodium laurate, nonylphenol ethers of polyethylene glycols and the like) and thereafter polymerizing the resulting aqueous dispersion.

Conventional emulsion polymerization catalysts can be employed in the foregoing polymerization and common examples thereof include peroxides, persulfates, azo compounds and the like such as sodium persulfate, potassium persulfate, ammonium persulfate, hydrogen peroxide, t-butyl hydroperoxide, cumene hydroperoxide, azodiisobutyric diamide as well as catalysts (e.g., redox catalysts) which are activated in the water phase (e.g., by a water-soluble reducing agent). Typically, such catalysts are employed in an amount ranging from 0.01 to about 5 weight percent based upon the monomer weight and in general the polymerization is conducted at a temperature in the range of from about 50° to about 110° C. (preferably from about 70° to about 90° C.) and at a pH of from about 2 to about 6, preferably from about 2 to about 5 and especially from about 2 to about 4.

Similarly, conventional chain transfer agents such as, for example, n-dodecyl mercaptan, bromoform, carbon tetrachloride and the like can also be employed in the normal fashion in the aforementioned first stage polymerization to regulate the molecular weight of the polymer formed therein and, typically, when such chain transfer agents are used, they are employed in amounts ranging from 0.01 to about 5 (preferably from about 0.1 to about 1) weight percent based upon the weight of the monomers employed in such first stage polymerization.

Following the hereinbefore discussed initial polymerization step (i.e., in which the initial hydrophilic polymer latex is first prepared), a second polymerization step is conducted in which a major portion (e.g., from about 50 to about 95, preferably from about 75 to about 95 and most preferably from about 80 to about 90, parts by weight) of a relatively hydrophobic monomer charge is emulsion polymerized in the presence of a minor proportion (e.g., from about 5 to about 50, preferably from about 5 to about 25 and most preferably from about 10 to about 20, parts by weight on a polymer solids basis) of such initial hydrophilic polymer latex.

Monomeric ingredients advantageously employed in the aforementioned relatively hydrophobic, second stage monomer charge include aliphatic conjugated diene monomers; monovinylidene monomers such as monovinylidene aromatic monomers and vinylidene halide monomers (e.g., vinylidene chloride, vinylidene bromide and the like) and comonomeric mixtures thereof.

Aliphatic conjugated diene monomers useful in such second stage hydrophobic monomer charge include those conventionally employed in known emulsion polymerization processes. Typically, such aliphatic conjugated dienes contain from 4 to about 9 carbon atoms and such monomers thus include 1,3-butadiene; 2-methyl-1,3-butadiene; 2,3-dimethyl-1,3-butadiene; pentadiene; 2-neopentyl-1,3-butadiene and other hydrocarbon analogs of 1,3-butadiene and, in addition, the substitute 1,3-butadienes such as 2-chloro-1,3-butadiene; 2-cyano-1,3-butadiene; the substituted straight chain conjugated pentadienes; the straight chain and branched chain conjugated hexadienes; other straight chain and branched chain conjugated dienes having from 4 to about 9 carbon atoms and comonomeric mixtures thereof. The 1,3-butadiene hydrocarbon monomers such as those mentioned hereinbefore provide polymers having particularly desirable properties and are therefore preferred. The cost, ready availability and the excellent properties of interpolymers produced therefrom make 1,3-butadiene the most preferred aliphatic conjugated diene for use in the process of the present invention.

Monovinylidene aromatic monomers useful in the aforementioned second stage hydrophobic monomer charge include those monomers wherein a radical of the formula:

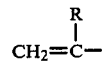

(wherein R is hydrogen or a lower alkyl such as an alkyl having from 1 to 4 carbon atoms) is attached directly to an aromatic nucleus containing from 6 to 10 carbon atoms, including those wherein the aromatic nucleus is substituted with alkyl or halogen substituents. Typical of these monomers are styrene; α-methylstyrene; ortho-, meta- and para-methylstyrene; ortho-, meta- and para-ethylstyrene; o,p-dimethylstyrene; o,p-diethylstyrene; isopropylstyrene; o-methyl-p-isopropylstyrene; p- chlorostyrene; p-bromostyrene; o,p-dichlorostyrene; o,p-dibromostyrene; vinylnaphthalene; diverse vinyl (alkylnaphthalenes) and vinyl (halonaphthalenes) and comonomeric mixtures thereof. Because of considerations such as cost, availability, ease of use, etc., styrene and vinyltoluene are preferred and styrene is especially preferred as the monovinylidene aromatic monomer.

In addition to the above-described monomers (e.g., the aliphatic conjugated diene; monovinylidene aromatic and/or vinylidene halide monomers), the relatively hydrophobic second stage monomer charge can also optionally contain minor proportions of other monomers which are addition copolymerizable therewith such as, for example, from 0 to about 20 weight percent of vinyl halide monomers such as vinyl chloride, etc.; the hereinbefore described nitriles, $C_1$ to about $C_8$ alkyl esters or $C_2$ to about $C_4$ hydroxyalkyl esters of the hereinbefore described monoethylenically unsaturated carboxylic acids; and the like (especially from 0 to about 10, more preferably from 0 to about 5, weight percent of a $C_2$ to $C_4$ hydroxyalkyl ester of such monoethylenically unsaturated carboxylic acid) and/or from 0 to about 10 (preferably from 0 to about 5) weight percent of the aforementioned monoethylenically unsaturated carboxylic acid itself.

Of particular interest as the second stage hydrophobic monomer charge in the practice of this invention are those comprising from about 20 to 100 (especially from about 20 to about 75) weight percent of the above-described monovinylidene aromatic or vinylidene halide monomer (especially the monovinylidene aromatic monomer) and/or from about 25 to 100 (especially from about 25 to about 80) weight percent of the aforementioned aliphatic conjugated diene monomer and from 0 to about 10 (especially from 0 to about 5) weight percent of the aforementioned monoethylenically unsaturated carboxylic acid monomer.

As was the case with the hereinbefore described first stage polymerization step (i.e., to form the initial, relatively hydrophilic polymer latex), the polymerization of the above-indicated relatively hydrophobic monomer charge (i.e., the second stage polymerization) is also conveniently conducted pursuant to essentially conventional emulsion polymerization techniques except, of course, for the fact that such second stage polymerization is conducted with the dispersed hydrophilic first stage copolymer particles being present in the aqueous medium thereof. Thus, for example, the above-described second stage hydrophobic monomer charge is typically dispersed, with agitation and with the aid of from about 0.5 to about 5 weight percent based upon such monomer charge of the aforementioned conventional anionic and/or nonionic emulsifiers, in an acidic aqueous medium containing the first stage, relatively hydrophilic polymer latex and is thereafter polymerized at a temperature from about 50° to about 110° C. (preferably from about 70° to about 90° C.) and at a pH of from 2 to about 6 (preferably from about 2 to about 5 and especially from about 2 to about 4).

Similarly, the hereinbefore described conventional emulsion polymerization catalysts and chain transfer agents can also be suitably employed in the normal fashion in the second stage polymerization and in such instances, each of such components will typically be employed in an amount ranging from about 0.01 to about 5 (especially from about 0.1 to about 1) weight percent based upon the weight of the second stage monomer charge involved.

Following completion of the above-discussed second stage polymerization, the solids content of the resulting copolymer latex can be adjusted to the level desired by adding water thereto or by distilling water therefrom. Generally, however, the desired polymer solids content will be from about 20 to about 65 (preferably from 30 to about 60) weight percent on a total weight basis and such solids content is typically obtainable directly from the instant polymerization process without the need for any such further adjustment therein.

Following their preparation in the foregoing manner, the resulting two stage latexes of the present invention can be advantageously employed in a wide variety of end-use applications (e.g., in coating formulations such as, for example, paints, pigmented paper coating compositions, etc.; in adhesive compositions; as impregnants and the like) and in such instances such latexes are suitably employed pursuant to the known techniques and procedures which are conventionally employed with other types of latexes in the chosen type of end-use application.

To further illustrate the practice of the present invention, the following non-limiting examples are presented and in such examples all parts and percentages are on a weight basis unless otherwise specified.

EXAMPLES 1 and 2

Styrene/Butadiene Monomer Mixture (60/40 Ratio) Emulsion Polymerized in the Presence of a 90/10 Ethyl Acrylate/Methacrylic Acid Copolymer Latex

EXAMPLE 1

In this example, an initial 90/10 weight ratio ethyl acrylate (EA)/methacrylic acid (MAA) copolymer latex is first prepared via emulsion polymerization and thereafter 80 parts of a 60/40 weight ratio styrene/butadiene monomer mixture is emulsion polymerized in the presence of 20 parts (on a polymer solids basis) of such EA/MAA copolymer latex.

In the preparation of the EA/MAA copolymer latex, the 90/10 weight ratio EA/MAA comonomer charge is continuously added, with stirring and over a two-hour period, to about 150 parts by weight (per 100 parts by weight of the comonomer charge) of an initial aqueous medium containing 0.02 part by weight of the pentasodium salt of diethylenetriaminepentaacetic acid and 1 part by weight of sodium dodecyldiphenyl ether disulfonate. In addition, an aqueous stream containing (based upon 100 parts by weight of the EA/MAA comonomer charge) 40 parts of deionized water, 0.5 part of sodium dodecyldiphenyl ether disulfonate, 0.5 part sodium persulfate and 0.1 part sodium hydroxide is added over a 2½-hour period commencing ¼ hour earlier than the start of the indicated EA/MAA monomer charge.

The EA/MAA polymerization is conducted at 80° C. during the course of the aforementioned 2½-hour aqueous stream addition and for an additional 1-hour "cookdown" period thereafter. Upon completion of such cookdown period, the resulting EA/MAA copolymer latex is found to have a total solids content of about 35 weight percent, a pH of about 3.6, an average particle size of about 0.1 micron at pH 4.0 and the degree of conversion monomer to polymer is found to be approximately 99 percent.

Following the above-described EA/MAA polymerization, 80 parts by weight of a 60/40 weight ratio styrene/butadiene monomer charge is emulsion polymerized in a second polymerization stage in the presence of 20 parts by weight, on a polymer solids basis, of the resulting 90/10 EA/MAA copolymer latex. In such second stage polymerization, the indicated 80 parts of 60/40 weight ratio styrene/butadiene comonomer charge is continuously added with stirring over a 4-hour period to an aqueous medium containing (1) about 85 parts water, (b) 20 parts (polymer solids basis) of the above-described EA/MAA copolymer latex, (c) 0.01 part of the pentasodium salt of diethylenetriaminepentaacetic acid and (d) 0.1 part of sodium dodecyldiphenyl ether disulfonate. In addition, an aqueous stream containing 40 parts of deionized water, 0.7 part of sodium dodecyldiphenyl ether disulfonate, 0.7 part of sodium persulfate and 0.15 part of sodium hydroxide is also added over a 5-hour period commencing at the same time as the start of the styrene/butadiene monomer feed and continuing for an additional hour following completion of such monomer feed.

The foregoing styrene/butadiene polymerization is conducted at 90° C. over a 6-hour period (i.e., for the aforementioned 5-hour aqueous feed period and for an additional 1-hour "cookdown" period thereafter) and the resulting polymer latex is found to have a polymer solids content of about 45 weight percent, a pH of about 5.0, an average particle size of about 0.16 micron and a minimum film-forming temperature of 56° C. In addition, the EA/MAA first stage copolymer is confirmed to be preferentially oriented toward the surface of the resulting polymer latex particle as evidenced by (a) the relatively high minimum film-forming temperature exhibited thereby, (b) the presence of acid functionality at the surface of the particles therein as determined by potentiometric titration thereof, (c) the free-film tensile strength and elongation performance thereof, (d) the pH effect under alkaline conditions on the viscosity of such latex (i.e., substantially higher viscosity at pH 8.5 than at pH 4.0) and (e) the electron micrographs of osmium tetraoxide-stained particle cross-sections.

EXAMPLE 2

Example 1 is repeated except that, in the EA/MAA polymerization step, 1 part bromoform (per 100 parts of the EA/MAA monomer charge) is added along with the EA/MAA monomer charge as a chain transfer agent in order to lower the molecular weight of the EA/MAA copolymer produced therein.

The resulting two stage latex ultimately produced generally resembles that of Example 1 except that it has (a) a relatively lower minimum film-forming temperature (i.e., 36° C. versus 56° C. for Example 1), (b) a somewhat larger apparent particle size than the latex of Example 1 by virtue of somewhat higher degree of swelling for the lower molecular weight outer EA/MAA copolymer layer and (c) lower tensile strength (1316 lb/in$^2$) and higher elongation (423 percent) for the free films formed therefrom relative to the corresponding values (i.e., tensile strength = 1569 lb/in$^2$ and elongation = 227 percent) for free films of the Example 1 latex having a relatively higher molecular weight first stage EA/MAA copolymer employed therein.

EXAMPLES 3–10

Styrene/Butadiene Monomer Mixture (60/40 Ratio) Emulsion Polymerized in the Presence of 49/49/2 Weight Ratio Vinyl Acetate/Ethyl Acrylate/Acrylic Acid Copolymers In these examples a series of polymerizations are conducted in which a styrene/butadiene or styrene/butadiene/acrylic acid monomer charge is emulsion polymerized in the presence of one of the three different 49/49/2 weight ratio vinyl acetate/ethyl acrylate/acrylic acid (i.e., VAc/EA/AA) copolymer latexes identified in Table I below.

In the preparation of the above-noted VAc/EA/AA copolymer latexes, a monomer charge containing 49 parts vinyl acetate, 49 parts ethyl acrylate and 2 parts acrylic acid (as well as either 0 or 0.5 part of CHBr$_3$) is continuously added over a 3-hour period to an initial aqueous medium containing, per 100 parts monomer charge, about 150 parts water; either 1 or 2 parts of sodium dodecyldiphenyl ether disulfonate; and 0.02 part of the pentasodium salt of diethylenetriaminepentaacetic acid and is polymerized therein at a temperature of 80° C. for a total time period of 4½ hours. In addition, an aqueous stream containing, per 100 parts monomer, 40 parts deionized water, 0.1 part sodium hydroxide, 0.5 part sodium persulfate and 0.5 part sodium dodecyldiphenyl ether disulfonate is continuously added over the first 3½ hours of the total 4½-hour polymerization period.

TABLE I

| | FIRST STAGE LATEX IDENTIFICATION | | | | | | | |
|---|---|---|---|---|---|---|---|---|
| First Stage Latex | Monomer Charge[1] | | | | Initial Aqueous Medium Surfactant[1,2] | Latex pH | Particle Size[3] | Solids Content (%) |
| | VAc[4] | EA[5] | AA[6] | CHBr$_3$ | | | | |
| A | 49 | 49 | 2 | 0 | 1 | 4.7 | 830 | 34.5 |
| B | 49 | 49 | 2 | 0.5 | 1 | 2.4 | 900 | 34.4 |
| C | 49 | 49 | 2 | 0 | 2 | 4.5 | 785 | 34.9 |

[1]In parts by weight
[2]Sodium dodecyldiphenyl ether disulfonate
[3]Average diameter in Angstroms
[4]VAc = Vinyl Acetate
[5]EA = Ethyl Acrylate
[6]AA = Acrylic Acid In the second polymerization stage of the instant examples, 80, 85, 90 or 95 parts of a monomer charge of styrene and butadiene or styrene, butadiene and acrylic acid (and, in some cases, also containing CCl$_4$ or CHBr$_3$ as a chain transfer agent) is emulsion polymerized in an aqueous medium containing, respectively, 20, 15, 10 or 5 parts (polymer solids basis) of one of the above-identified first stage latexes (i.e., Latexes A, B or C above) as indicated in Table II below. In such second stage polymerization, the general procedure of the second stage polymerization in Example 1 above is employed except that (a) the water content of the initial aqueous medium is about 112 parts (exclusive of the water content of the first stage latex included therein) instead of 85 parts, (b) the continuously added aqueous stream contains 0.1 part NaOH in Examples 4–10 and 0.05 part NaOH in Example 3 rather than the 0.15 part of Example 1 and (c) naturally the types and amounts of (1) the first stage latex, (2) the second stage monomer charge and (3) the chain transfer agent are as indicated in Table II below rather than as indicated in Example 1 above.

The properties of the latexes resulting from the foregoing polymerizations (and of free films formed therefrom) are summarized in Table III below.

TABLE II
STAGED LATEX RECIPES

| Example No. | First Stage Latex Type | First Stage Latex Amount[1] | Second Stage Monomer Charge[2] S[3] | B[4] | AA[5] | CCl₄ | CHBr₃ |
|---|---|---|---|---|---|---|---|
| 3 | A | 20 | 48 | 32 | — | — | — |
| 4 | B | 20 | 48 | 32 | — | — | — |
| 5 | A | 20 | 46.4 | 32 | 1.6 | — | — |
| 6 | B | 20 | 46.4 | 32 | 1.6 | — | — |
| 7 | B | 20 | 46.4 | 32 | 1.6 | — | 0.8 |
| 8 | C | 10 | 52.2 | 36 | 1.8 | 3.6 | — |
| 9 | C | 5 | 55.1 | 38 | 1.9 | 3.8 | — |
| 10 | C | 15 | 49.3 | 34 | 1.7 | 3.4 | — |

[1] In parts by weight on a polymer solids basis
[2] In parts by weight
[3] S = Styrene
[4] B = Butadiene
[5] AA = Acrylic Acid

TABLE III
PROPERTIES OF THE LATEXES AND FREE FILMS THEREOF

| Ex. No. | Latex pH | Part. Size[1] | Solids Content[2] | Min. Film Forming Temp (°C.) | Tensile Strength[3] | Elongation[4] | Modulus @ 100% Elong. |
|---|---|---|---|---|---|---|---|
| 3 | 2.5 | 1420 | 39.7 | 47.5 | 730 | 224 | 415 |
| 4 | 2.6 | 1630 | 40.3 | 53 | 942 | 200 | 575 |
| 5 | 3.3 | 1400 | 40.2 | 51 | 1194 | 172 | 799 |
| 6 | 2.3 | 1480 | 40.0 | 59 | 1166 | 76 | 716 |
| 7 | 2.4 | 1440 | 39.6 | 46.5 | 1005 | 411 | 263 |
| 8 | 3.0 | 1480 | 38.4 | 39 | 1140 | 520 | 220 |
| 9 | 2.9 | 1880 | 38.2 | 38.5 | 1125 | 564 | 210 |
| 10 | 2.9 | 1310 | 38.7 | 39.5 | 1262 | 487 | 264 |

[1] Average diameter in Angstroms
[2] Weight percent on a total weight basis
[3] In lbs/in²
[4] In percentages

EXAMPLES 11-14

Four staged latexes having the recipes set forth in Table IV below are prepared pursuant to the polymerization procedure of Examples 3-10 above except that (a) the first stage monomer addition and polymerization is conducted over a shortened period of only ½ hour and (b) the addition of the second stage monomer charge is commenced immediately at the end of such ½-hour period (i.e., without any intermediate "cookdown" for the first stage polymer) and is accomplished over a 4½- (rather than 5-) hour period. In addition, only a single sodium persulfate-containing aqueous stream is employed (i.e., rather than one such addition for each polymerization stage) and the addition thereof is continuous (and at a uniform rate) over the entire 6-hour polymerization period employed (i.e., ½ hour for the first stage polymerization, 4½ hours for the second stage monomer addition and polymerization plus a one-hour "cookdown" period at the end of the second stage monomer addition).

The properties of the latexes resulting from the foregoing polymerization (and of free films formed therefrom) are summarized in Table V below.

TABLE IV
STAGED LATEX RECIPES

| Example No. | First Stage Monomer Charge* EA[1] | VAc[2] | AA[3] | Total | Second Stage Monomer Charge* S[4] | B[5] | AA[3] | (CCl₄)[6] | Total |
|---|---|---|---|---|---|---|---|---|---|
| 11[7] | 4.9 | 4.9 | 0.2 | 10 | 52.2 | 36 | 1.8 | 3.6 | 90 |
| 12[8] | 9.8 | 9.8 | 0.4 | 20 | 46.4 | 32 | 1.6 | 3.2 | 80 |
| 13[8] | 4.9 | 4.9 | 0.2 | 10 | 52.2 | 36 | 1.8 | 3.6 | 90 |
| 14[7] | 9.8 | 9.8 | 0.4 | 20 | 46.4 | 32 | 1.6 | 3.2 | 80 |

*In parts by weight
[1] EA = Ethyl Acrylate
[2] VAc = Vinyl Acetate
[3] AA = Acrylic Acid
[4] S = Styrene
[5] B = Butadiene
[6] Carbon tetrachloride as chain transfer agent
[7] Sodium dodecyldiphenyl ether disulfonate surfactant usage is 0.5 part in initial aqueous medium and 0.7 part in the continuously added aqueous stream.
[8] Sodium dodecyldiphenyl ether disulfonate surfactant usage 0.1 part in initial aqueous medium and 0.7 part in the continuously added aqueous stream.

TABLE V
LATEX AND FREE FILM PROPERTIES

| Ex. No. | Latex pH | Part. Size[1] | Solids Content[2] | Min. Film Forming Temp (°C.) | Tensile Strength[3] | Elongation[4] | Modulus @ 100% Elong. |
|---|---|---|---|---|---|---|---|
| 11 | 3.1 | 1190 | 38.1 | 41 | 1119 | 489 | 242 |
| 12 | 3.3 | 1630 | 38.6 | 38.5 | 1618 | 330 | 534 |
| 13 | 3.3 | 1420 | 36.8 | 39.5 | 1055 | 558 | 203 |
| 14 | 3.2 | 1440 | 37.1 | — | — | — | — |

[1] Average diameter in Angstroms
[2] Weight percent on a total weight basis
[3] In lb/in²
[4] In percentages

EXAMPLES 15-23

Paper Coating Compositions Employing Latexes of Examples 5-10 and 11-13 as a Binder Component Therein Twenty parts (polymer solids basis) of each of the above-described latexes of Examples 5-10 and 11-13 are admixed with 100 parts of No. 1 clay to form a paper coating composition and the pH thereof is adjusted to a value of 8 with sodium hydroxide. Thereafter, the viscosity of the resulting paper coating compositions is determined at various total solids levels. In addition, the paper coating performance of the resulting compositions is evaluated by coating a general purpose basestock therewith using a conventional laboratory scale bench blade coater; calendering the resulting coated paper for four nips at 1200 pounds per linear inch and 150° C. and thereafter determining the 75° gloss, brightness and K&N ink receptivity thereof in the usual fashion.

The results of the forementioned paper coating composition evaluations are summarized in Table VI below. In addition, the aforementioned coated papers are also evaluated for coating smoothness in terms of Heliotest printability thereof and are found to possess very good coating smoothness pursuant thereto.

TABLE VI

PAPER COATING PERFORMANCE EVALUATION FOR EXAMPLES 5-10 AND 11-13 LATEXES

| Paper Coating Property | Example Number | | | | | | | | |
|---|---|---|---|---|---|---|---|---|---|
| | 15 | 16 | 17 | 18 | 19 | 20 | 21 | 22 | 23 |
| Latex Employed | Ex. 5 | Ex. 6 | Ex. 7 | Ex. 8 | Ex. 9 | Ex. 10 | Ex. 11 | Ex. 12 | Ex. 13 |
| Coating Composition Viscosity[1]: | | | | | | | | | |
| @ 62% solids | 3050 | 9600 | 8800 | — | — | — | — | — | — |
| @ 59% solids | — | — | — | 3100 | 3100 | 3700 | 1250 | 1250 | 1250 |
| @ 55% solids | 1100 | 4800 | 5000 | 750 | 900 | 850 | 450 | 425 | 425 |
| Coating Weight[2] | 5.4 | 6.0 | 6.0 | 5.7 | 5.0 | 4.8 | 4.7 | 4.6 | 4.8 |
| 75° Gloss[3] | 75 | 76 | 80 | 74 | 75 | 73 | 73 | 71 | 74 |
| Brightness | | | | | | | | | |
| Initial (%) | 78.3 | 78.7 | 78.4 | 79.4 | 79.4 | 79.8 | 80.0 | 79.3 | 79.2 |
| After K & N Ink, % | 65.0 | 63.8 | 65.7 | 65.5 | 65.0 | 66.8 | 68.2 | 65.3 | 66.7 |
| % Drop | 17.0 | 18.9 | 16.2 | 17.5 | 18.1 | 16.3 | 14.8 | 18.2 | 15.8 |

[1]In centipose as measured at 20 rpm using a Brookfield viscometer [2]In pounds per book ream
[3]Measured using a glossimeter after 4 calendar nips at 1200 pli and at 150° F.

EXAMPLES 24-27

Styrene/Butadiene Monomer Mixture Emulsion Polymerized in the Presence of a Copolymer Latex of Ethyl Acrylate (or Ethyl Acrylate and Acrylic Acid) With N-Methylolacrylamide, Glycidyl MethAcrylate or Acrolein A series of four latexes are prepared as indicated in Table VII below by emulsion polymerizing a 60/40 weight ratio styrene/butadiene second stage monomer charge in the presence of a first stage copolymer latex of ethyl acrylate (or ethyl acrylate and acrylic acid) and a curable (i.e., cross-linkable) monomer species selected from N-methylolacrylamide, glycidyl methacrylate or acrolein. In such fashion, copolymer latexes composed predominantly of styrene and butadiene are provided which are modified with functional or curable monomers which are not readily copolymerizable with styrene and butadiene.

TABLE VII

LATEX RECIPES FOR EXAMPLES 24-27

| Example No. | First Stage Monomer Charge | | | | | Second Stage Monomer Charge* | |
|---|---|---|---|---|---|---|---|
| | EA[1] | AA[2] | N—MA[3] | GMA[4] | Acrolein | S[5] | B[6] |
| 24 | 9 | 0.5 | 0.5 | — | — | 54 | 36 |
| 25 | 18 | 1.0 | 1.0 | — | — | 48 | 32 |
| 26 | 9 | — | — | 1.0 | — | 54 | 36 |
| 27 | 9 | — | — | — | 1.0 | 54 | 36 |

*In parts by weight
[1]EA = Ethyl Acrylate
[2]AA = Acrylic Acid
[3]N—MA = N—Methylolacrylamide
[4]GMA = Glycidyl Methacrylate [5]S = Styrene
[6]B = Butadiene In the preparation of the foregoing latexes, the general procedure of Examples 11-14 above is employed except that (a) the first stage monomer feed and polymerization period is 45 minutes rather than ½ hour, (b) the second stage monomer charge is continuously added over a 3.6- (rather than 4.5-) hour period, (c) the continuously added aqueous stream contains about 0.6 part NaHCO₃ (rather than 0.1 part NaOH) for pH control, (d) the polymerization is conducted at a temperature of 80° C. (rather than 90° C.) and the "cookdown" period following completion of the aqueous stream is 1½ hours (rather than 1 hour) and (e) the initial aqueous sodium contains about 150 (rather than 112) parts water and 0.02 (rather than 0.01) part of the pentasodium salt of diethylenetriaminepentaacetic acid.

Following their preparation in the foregoing fashion, the resulting latexes are employed to form free films under various drying/curing conditions and the films thereby obtained are evaluated in terms of the tensile strength and elongation thereof. The properties of the resulting films are summarized in Table VIII below:

TABLE VIII

LATEX PROPERTIES FOR EXAMPLES 24-27

| Property | Latex | | | |
|---|---|---|---|---|
| | Example No. 24 | Example No. 25 | Example No. 26 | Example No. 27 |
| Latex pH* | 8.0 | 8.0 | 9.0 | 9.0 |
| Particle Size | 1210 A | 1175 A | 1270 A | 1030 A |
| Solids Content (%)[1] | 34.9 | 34.2 | 34.9 | 34.6 |
| Room Temp. Drying | W/O NH₄Cl[3] | W/O NH₄Cl[3] | W/ NH₄Cl[4] | W/ NH₄Cl[4] |
| Tensile Strength[2] | 668 | 606 | 413 | 239 |
| Elongation (%) 3 Min. @ 200° F. | 360 | 320 | 320 | 240 |

W/ NH₄Cl[4]
1142
327

TABLE VIII-continued
LATEX PROPERTIES FOR EXAMPLES 24-27

| | Latex | | | |
|---|---|---|---|---|
| Property | Example No. 24 | Example No. 25 | Example No. 26 | Example No. 27 |
| Tensile Strength[2] | 922 | 660 | 646 | 671 | 1451 |
| Elongation (%) | 404 | 316 | 312 | 355 | 355 |
| 3 Min. @ 250° F. | | | | | |
| Tensile Strength[2] | 1037 | 767 | 853 | 751 | 1391 |
| Elongation (%) | 410 | 350 | 345 | 376 | 335 |
| 3 Min. @ 300° F. | | | | | |
| Tensile Strength[2] | 1227 | 920 | 1080 | 1422 | 2303 |
| Elongation (%) | 435 | 350 | 333 | 490 | 395 |

*Latex pH after steam stripping and pH adjustment with aqueous alkaline solutions
[1] Total weight basis
[2] lb/in$^2$
[3] Without any NH$_4$Cl added as an acid catalyst
[4] With 1 part by weight NH$_4$Cl added as an acid catalyst While the instant invention has been described and illustrated herein with reference to specific examples and embodiments thereof, such fact is not to be understood as in any way limiting the scope of the instantly claimed invention.

What is claimed is:

1. A process for preparing an aqueous copolymer latex of colloidally dispersed, substantially spheroidal, heterogeneous copolymer particles which are individually composed of a relatively hydrophobic polymer core portion having a relatively hydrophilic, polymeric portion preferentially oriented toward the outer surface thereof, said process comprising the steps of:
   (a) first preparing an initial aqueous latex of a substantially linear hydrophilic polymer by emulsion copolymerizing at a pH of from about 2 to about 6 in the substantial absence of a cross-linking agent an initial monomer charge comprising (1) one or more vinyl esters of a non-addition polymerizable carboxylic acid and/or one or more esters of an addition polymerizable carboxylic acid and (2) one or more relatively hydrophilic comonomers in an amount which renders the copolymer of said initial latex sufficiently hydrophilic that it ultimately becomes preferentially oriented toward the outer surface of the finished copolymer particles of the final copolymer latex product, said relatively hydrophilic comonomer having a solubility in water of at least about 3 weight percent on a total weight basis at 25° C. and with the proviso that such hydrophilic comonomer can be excluded when the monomer component of step (a)(1) is exclusively vinyl acetate; and
   (b) thereafter emulsion polymerizing, in the presence of from about 5 to about 50 parts by weight on a polymer solids basis of the initial hydrophilic polymer latex of step (a) and at a pH of from about 2 to about 6, from about 50 to about 95 parts by weight of a second monomer charge comprising (1) an aliphatic conjugated diene and/or an addition polymerizable monovinylidene monomer selected from the group consisting of monovinylidene aromatic monomers and vinylidene halide monomers and (2) from 0 to about 10 weight percent based upon the weight of such second monomer charge of a monoethylenically unsaturated carboxylic acid monomer.

2. The process of claim 1 wherein the second monomer charge comprises, based upon the weight thereof, (1) from about 20 to 100 weight percent of a monovinylidene monomer selected from the group consisting of monovinylidene aromatic monomers and vinylidene halide monomers and (2) from 0 to about 10 weight percent of a monoethylenically unsaturated carboxylic acid.

3. The process of claim 2 wherein the second monomer charge comprises from 0 to about 5 weight percent of a monoethylenically unsaturated carboxylic acid monomer based upon the weight of such second monomer charge.

4. The process of claim 1 wherein the second monomer charge comprises from about 25 to about 100 weight percent of an aliphatic conjugated diene based upon the weight of such second monomer charge.

5. The process of claim 1 wherein the second monomer charge comprises, based upon the total weight thereof, (1) from about 20 to about 75 weight percent of a monovinylidene aromatic monomer; (2) from 25 to about 80 percent of the aliphatic conjugated diene and (3) from 0 to about 10 percent of the monoethylenically unsaturated carboxylic acid monomer.

6. The process of claim 1 wherein, in the initial monomer charge of step (a), the hydrophilic monomer is a monoethylenically unsaturated carboxylic acid monomer and is employed in the range of from about 1 to about 50 weight percent based upon the weight of such initial monomer charge.

7. The process of claim 1 wherein the initial monomer charge comprises from about 70 to about 99 weight percent of one or more vinyl esters of nonaddition polymerizable carboxylic acids and/or one or more saturated aliphatic or aromatic alcohol esters of a monoethylenically unsaturated carboxylic acid and (2) from about 1 to about 30 weight percent of a monoethylenically unsaturated carboxylic acid monomer; both weight percentages being based upon the total weight of such initial monomer charge.

8. The process of claim 1 wherein the initial monomer charge of step (a) further comprises, based upon the weight of such initial monomer charge, from about 0.5 to about 20 weight percent of a modifying monomer suitable for providing the final copolymer latex with reactive sites adapted for subsequent curing or cross-linking of the final copolymer product via a non-addition polymerization type of reaction mechanism.

9. The process of claim 8 wherein the modifying monomer employed in step (a) is selected from the group consisting of N-methylol acrylamide or methacrylamide, N-isobutoxymethyl acrylamide or methacrylamide, glycidyl acrylate or methacrylate, acrolein or methacrolein and isopropenyl oxazoline.

10. The process of claim 1 wherein the weight ratio of the initial monomer charge to the second monomer charge is from about 5:95 to about 20:80.

11. The process of claim 10 wherein the initial monomer charge comprises, based on the total weight thereof, from about 70 to about 99 weight percent of a vinyl ester of a $C_1$ to about $C_6$ alkanoic acid or a $C_1$ to about $C_3$ alkyl ester of acrylic acid and from about 1 to about 30 weight percent of the monoethylenically unsaturated carboxylic acid monomer.

* * * * *